Figure 1:
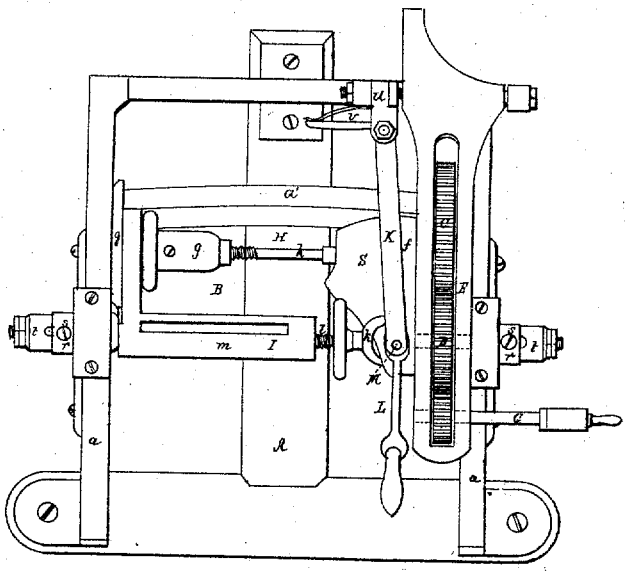

2 Sheets--Sheet 1.

R. C. LAMBERT.

Machines for Trimming the Edges of Boot and Shoe Soles.

No. 5,661. Reissued Nov. 18, 1873.

Witnesses
M. W. Frothingham.
L. H. Latimer.

Inventor.
Richard C. Lambert,
By his Attys.
Crosby & Gould.

AM. PHOTO-LITHOGRAPHIC Co. N.Y. (OSBORNE'S PROCESS.)

R. C. LAMBERT.

Machines for Trimming the Edges of Boot and Shoe Soles.

No. 5,661. Reissued Nov. 18, 1873.

Witnesses.
M. W. Frothingham.
L. H. Latimer.

Inventor.
Richard C. Lambert,
By his Attys.
Crosby & Gould

AM. PHOTO-LITHOGRAPHIC Co. N.Y. (OSBORNE'S PROCESS)

UNITED STATES PATENT OFFICE.

RICHARD C. LAMBERT, OF QUINCY, MASS., ASSIGNOR, BY MESNE ASSIGNMENTS, TO THE SHOE-MACHINERY MANUFACTURING COMPANY.

IMPROVEMENT IN MACHINES FOR TRIMMING THE EDGES OF BOOT AND SHOE SOLES.

Specification forming part of Letters Patent No. 80,828, dated August 11, 1868; reissue No. 5,661, dated November 18, 1873; application filed November 10, 1873.

*To all whom it may concern:*

Be it known that I, RICHARD C. LAMBERT, of Quincy, in the county of Norfolk and State of Massachusetts, have invented a new and useful Machine for Trimming, or Paring and Smoothing, or Beading the Edge of a Shoe or Boot; and I do hereby declare the same to be fully described in the following specification, and represented in the accompanying drawings.

The invention relates to an improved organization and arrangement of mechanism for operating upon the edges of the soles of boots and shoes to trim or smooth such edges.

In such organization I mount the boot or shoe upon a horizontal jacking mechanism, or in such manner that the sole-face of the shoe is in an approximately vertical plane, or faces to the front, and the edge treating or trimming tool I arrange so as to overhang the sole-edge, and the sole and tool being in these respective positions, I impart to the boot or shoe such a compound rotative and longitudinal movement as shall progressively bring the sole-edge to be acted upon under the action of the overhanging tool, the tool having capability of such movements as to enable it to follow the curvatures of the sole and sole-edge under such movements of the boot or shoe, and the operator being thus enabled to inspect the work as it progresses, and more readily control the action of the tool.

One part of my invention consists in an organization of mechanism in which the boot or shoe to be sole-edge trimmed is thus jacked or held, and while so jacked has movements imparted to it to bring its edge to be acted upon into position for the operation of an overhanging tool arranged to follow the curvatures of the sole and sole-edge, and in accordance with the movements of the boot or shoe. The shoe-holding mechanism has a semi-rotative movement for the action of the tool around its toe and upon the heel, and a straight horizontal movement for action of the tool upon its edges between the toe and heel, (which movement is in a vertical plane, and constitutes part of this invention,) and while describing its rotative movements the jack mechanism is locked, as to lateral movement, and one part of the invention consists in combining, with the longitudinally-moving and rotatively-moving jack or shoe-holding mechanism, a locking mechanism that prevents other movement of the jack or shoe-holding mechanism during the rotative movement thereof. Another part of the invention consists in combining, with the shoe-holding mechanism and the edge-treating tool, an oblong gear, forming part of the jack mechanism, and a pinion-gear, which pinion, by its rotation, imparts the respective movements to the jack mechanism. Another part of the invention consists in combining, with the jack mechanism, a guiding mechanism, by which the jack is maintained in proper position during its longitudinal and rotative movements, and also in a cam-grooved plate as a specific agent in such guidance. The invention further consists in details of construction and arrangement, both of the shoe-holding mechanism and of the tool-holding mechanism.

The drawing represents an organization embodying the invention.

Figure 2:
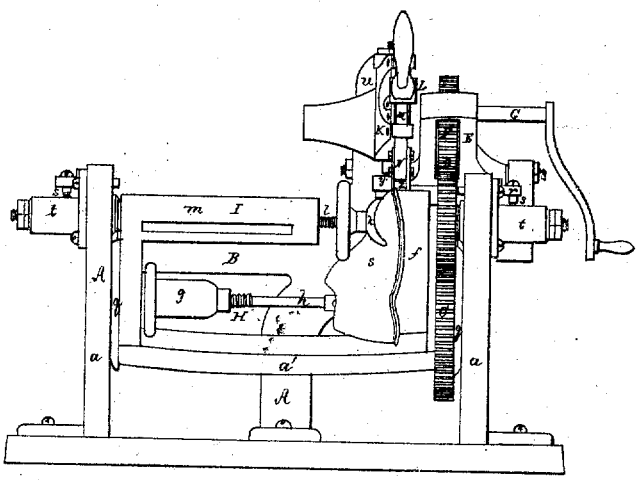
Figure 3:
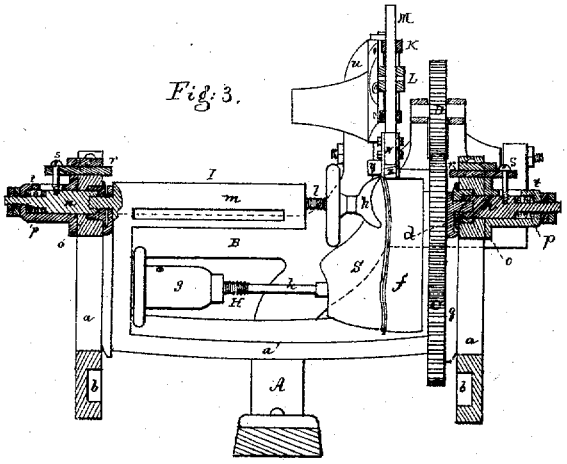
Figure 4:
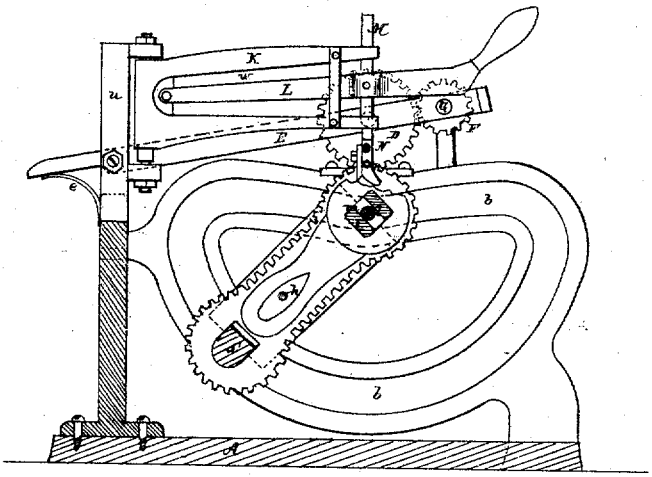

Figure 1 is a top view, Fig. 2 is a front elevation, Figs. 3 and 4 are vertical sections, of it.

Figure 5:
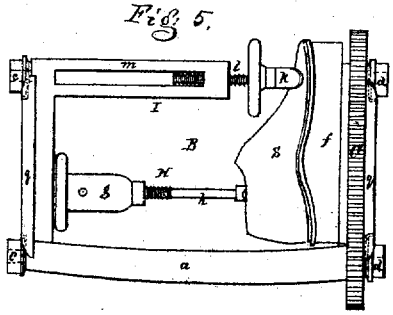

In such drawings, A denotes the frame of the machine, the inner face of each side, *a a*, being grooved in manner as represented at *b b* in Figs. 3 and 4. These grooves are to receive the supporting rollers or wheels *c c* and *d d* of a jack or carriage, B, such wheels being arranged on it in manner as represented in Fig. 5, which is a top view of such carriage or jack, as separate from the frame A. An elongated gear is affixed to the carriage and jack, and engages with a circular gear, D, supported by a vibratory lever, E, and made to engage with a pinion, F, arranged upon such lever and upon a cranked shaft, G. A spring, *e*, acting against the rear arm of the lever E, operates to keep the gear D in engagement with the elongated gear C while the two are in movement. Within the carriage B is a sole-rest and pattern, *f*, which is to support the sole of a shoe, S, during the operation of paring such sole, and is to serve as a pattern to guide the paring-cutter while in operation. The shoe is forced against the sole-rest by means of two screw-clamps or pressers, H I, arranged within the carriage or jack, in manner as represented.

The clamp H consists of a rotary nut, *g*, and a stationary screw, *h*. The clamp I consists of a saddle, *k*, and a rotary screw, *l*, the latter being screwed into the part *m* of the jack. By revolving the cranked shaft G, vertical, endwise, and rotary movements will be imparted to the jack. Each end part of the elongated gear C is a circular segment. When either of these segmental portions comes into operation with the gear D, two cylindrical bolts, *n n*, are shot into corresponding recesses *o o*, made in the journals of the wheels of the jack, there being such a recess in the journal of each of the wheels of the jack. These bolts, while in either pair of recesses, prevent the journals thereof from having any lateral motion, excepting that of revolving on their axes. The bolts, at proper periods, are shot forward by springs *p p*, and are moved in the opposite directions, and held out of action with the jack by means of two cam-bars, *q q*, fixed to the jack, and operating against sliders *r r*, supported within the frame A, and connected with the bolts by screws *s s*. The said bolts with their springs are arranged in cases *t t*, fixed to the frame A. A bent lever, K, so pivoted to a standard, *u*, erected on the frame A, as to be capable of being swung or vibrated horizontally, has a spring, *v*, applied to its shorter arm, and fixed to the said standard, the spring operating to force the longer arm of the lever in a direction toward the gear D. Within the said longer arm—that is, within a space, *w*, formed therein—another or hand-lever, L, is arranged, and is fastened at its rear end to the arm, so as to be capable of being moved vertically. The lever L is jointed to a slide-rod, M, so applied to the lever K as to be capable of playing vertically within it. The said rod projects upward from a cutter-head carrier or frame, N, which carries a paring-knife, *x*, a gage or guide, *y*, and it may also have applied to it a tool or device for either smoothing or smoothing and creasing the sole-edge. The guide or gage *y* runs between the sole and the upper leather of the shoe, and, by being pressed against the sole by the action of spring *v*, keeps the paring-knife from cutting into the upper leather. The cutter-frame or head N rests directly upon the periphery of the pattern *f*, which gages the depth of cut of the knife *x*, and causes it to cut in accordance with the pattern.

The back part of the heel of the sole is not pared by the machine, as the attendant, while the back part *a'* of the jack may be revolving under the cutter, should keep the lever L raised so as to prevent the guide *y* from running in contact with the part *a'*.

With the said machine, a sole, when sewed or secured to the upper of a shoe, may have its edge pared and smoothed, or pared, smoothed, and creased with great facility and accuracy.

I claim—

1. In a machine for trimming, paring, smoothing, or beading the edges of soles of boots and shoes, the combination of a boot or shoe holding mechanism that presents the sole-edge in a substantially vertical plane, and an overhanging tool that acts upon such edge, and is capable of following the curvatures of the sole and sole-edge as such edge is progressively brought under the tool.

2. In combination with the overhanging operating tool, a jack mechanism, having successive longitudinal and semi-rotative movements for bringing the sole-edge to the action of the tool.

3. In combination with the longitudinally and rotatively moving jack mechanism, carrying and supporting the shoe-sole in a vertical plane, a locking mechanism for confining the jack during its rotative movements.

4. In combination with the jack or shoe-holding mechanism, the oblong gear and pinion, arranged in a vertical plane, and operating to impart the respective movements to the jack, substantially as described.

5. In combination with the longitudinally and rotatively moving shoe-holding mechanism, the cam-grooved plate *a* for guiding such shoe-holding mechanism, substantially as described.

6. In combination with the longitudinally and rotatively moving shoe-holding mechanism, a tool-holder, having a compound joint to permit its vertical, lateral, and angular movements, substantially as described.

7. In combination with the shoe-holding mechanism, a tool which is held to or toward the sole-edge by the stress of suitable springs.

8. In combination with the shoe-holding mechanism, a pattern-plate, adapted to the sinuosities of the whole sole, for regulating the action of the tool, substantially as described.

9. In combination with the plate *f*, having the outline of a shoe-sole, a clamping mechanism for clamping the shoe against said plate, substantially as described.

R. C. LAMBERT.

Witnesses:

FRANCIS GOULD,

M. W. FROTHINGHAM.